United States Patent
Singh et al.

(10) Patent No.: US 9,363,690 B1
(45) Date of Patent: Jun. 7, 2016

(54) CLOSED-LOOP OPTIMIZATION OF A WIRELESS NETWORK USING AN AUTONOMOUS VEHICLE

(71) Applicant: Cisco Technology, Inc., San Jose, CA (US)

(72) Inventors: Baljit Singh, Cumming, GA (US); OM Prakash Suthar, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/854,534

(22) Filed: Sep. 15, 2015

Related U.S. Application Data (60) Provisional application No. 62/191,080, filed on Jul. 10, 2015.

(51) Int. Cl.
  *H04W 24/00*  (2009.01)
  *H04W 24/02*  (2009.01)
  *H04B 7/185*  (2006.01)
  *H04W 24/08*  (2009.01)
  *H04W 24/10*  (2009.01)
  *H04W 84/18*  (2009.01)

(52) U.S. Cl.
  CPC ........... *H04W 24/02* (2013.01); *H04B 7/18506* (2013.01); *H04W 24/08* (2013.01); *H04W 24/10* (2013.01); *H04W 84/18* (2013.01)

(58) Field of Classification Search
  CPC ..... H04W 24/02; H04W 24/08; H04W 24/10; H04W 84/18; H04B 7/18506
  See application file for complete search history.

(56) References Cited

U.S. PATENT DOCUMENTS

| | | | | |
|---|---|---|---|---|
| 6,141,565 A | * | 10/2000 | Feuerstein | H04W 16/06 455/422.1 |
| 6,842,674 B2 | | 1/2005 | Solomon | |
| 7,415,313 B2 | | 8/2008 | Brueckner et al. | |
| 2015/0140954 A1 | | 5/2015 | Maier et al. | |
| 2015/0236778 A1 | * | 8/2015 | Jalali | H04W 84/06 370/316 |
| 2015/0312774 A1 | * | 10/2015 | Lau | H04W 16/20 455/446 |

(Continued)

OTHER PUBLICATIONS

Nokia Networks, du first in UAE to use telco drones for better network planning & faster optimization, Jul. 7, 2015, retrieved Sep. 10, 2015, 5 pages, Nokia Solutions and Networks, <http://networks.nokia.com/news-events/press-room/press-releases/nokia-networks-du-first-in-uae-to-use-telco-drones-for-better-network-planning-faster-opti>.

(Continued)

*Primary Examiner* — Pakee Fang
(74) *Attorney, Agent, or Firm* — Patterson + Sheridan LLP (57) ABSTRACT

Embodiments herein use a real-time closed-loop system to optimize a wireless network. The system includes a drone controlled by a self-organizing network (SON) to retrieve RF data corresponding to the wireless network. In one embodiment, the SON provides the drone with a predetermined path through the coverage area of the wireless network. As the drone traverses the path, a RF scanner mounted on the drone collects RF data. The drone transmits this data to the SON which processes the RF data to identify problems in the wireless network (e.g., cell tower interference). The SON generates one or more actions for correcting the identified problem and transmits these actions to a wireless network controller. Once the wireless network controller performs the action, the SON instructs the drone to re-traverse the portion of the path to determine if the problem has been resolved.

18 Claims, 5 Drawing Sheets

(56) References Cited

U.S. PATENT DOCUMENTS

2015/0356482 A1* 12/2015 Whipple ............... G06Q 50/06
  705/7.23
2016/0040902 A1* 2/2016 Shah ..................... F24F 11/006
  700/277

OTHER PUBLICATIONS

Brown, Mark, Kinect-carrying drone automatically builds 3D maps of rooms, WIRED.CO.UK, Mar. 31, 2011, 3 pages, <http://www.wired.co.uk/news/archive/2011-03/31/kinect-drone>.

Smith, Brett, Drones Help Create Detailed Maps of Coral Reefs, redOrbit: Your Universe Online, Oct. 16, 2013, 3 pages, <http://www.redorbit.com/news/science/1112976710/drones-help-create-detailed-maps-of-coral-reefs/>.

Turk, Victoria, Drones Mapped the Philippines to Improve Typhoon Aid Efforts, Motherboard, May 9, 2014, 10 pages, <http://motherboard.vice.com/read/drones-mapped-the-philippines-to-improve-typhoon-aid-efforts>.

Intel and Cisco: Collaborative Testing of a Media-Ready WLAN Solution: Executive Summary, White Paper, pp. 1-6, 2011, Intel Corporation, Santa Clara, United States.

* cited by examiner

CLOSED-LOOP OPTIMIZATION OF A WIRELESS NETWORK USING AN AUTONOMOUS VEHICLE

CROSS-REFERENCE TO RELATED APPLICATIONS

This application claims benefit of U.S. Provisional Patent Application Ser. No. 62/191,080, filed Jul. 10, 2015, which is incorporated by reference in its entirety.

TECHNICAL FIELD

Embodiments presented in this disclosure generally relate to optimizing a wireless network, and more specifically, to using a closed-loop system that includes a drone for optimizing the wireless network in real-time.

BACKGROUND

Operators of wireless networks (e.g., cell phone providers, mobile data providers, and the like) typically rely on field test engineers to gather RF data that can be used to optimize the wireless networks. To gather the RF data, the field test engineers drive or carry test equipment along a predetermined path—e.g., a route on city streets—which measures RF data at different locations along the path. Typically, the test equipment includes a RF scanner that gathers RF data being transmitted by transmitters in the wireless network (e.g., cell towers).

After the RF data is gathered, a network engineer evaluates the data and identifies problems in the wireless network, such as interference or dead spots. The network engineer can optimize the wireless network to correct the problem. For example, the network engineer may submit a request to change an operation parameter of one of the cell towers in the wireless network. Typically, it can take several days or even weeks for the RF data measured by the field engineer to result in changes to the wireless network.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method that includes transmitting a path to a drone and receiving, at a self-organizing network (SON), RF data measured by the drone while traversing the path. Upon determining a problem in a wireless network based on the received RF data, the method includes transmitting an action to change a parameter of a wireless network. After transmitting the action to change the parameter, the method includes instructing the drone via the SON to measure updated RF data at a location on the path corresponding to the problem. The method includes evaluating the updated RF data at the SON to determine whether the problem was resolved.

Another embodiment presented in this disclosure is SON that includes a drone controller configured to transmit a path to a drone and an optimization module configured to receive RF data measured by the drone while traversing the path, and upon determining a problem in a wireless network based on the received RF data, transmit an action to change a parameter of the wireless network. The optimization module is configured to instruct the drone via the drone controller to measure updated RF data at a location on the path corresponding to the problem and evaluate the updated RF data to determine whether the problem was resolved.

Another embodiment presented in this disclosure is a communication system that includes an autonomous vehicle (AV), a wireless network comprising a plurality of cell towers controllable by a network controller to establish a wireless network, and a SON. The SON is configured to transmit a path to the AV to traverse in the wireless network and receive RF data measured by the AV while traversing the path. Upon determining a problem in the wireless network based on the received RF data, the SON is configured to transmit an action to the network controller to change a parameter of the wireless network. The SON is configured to instruct the AV to measure updated RF data at a location on the path corresponding to the problem and evaluate the updated RF data at the SON to determine whether the problem was resolved.

Example Embodiments

Embodiments herein use a real-time closed-loop system to optimize a wireless network. The system includes an autonomous vehicle (referred to herein as a drone) which is controlled by a self-organizing network (SON) to retrieve RF data corresponding to the wireless network. In one embodiment, the SON provides the drone with a predetermined path through the coverage area of the wireless network. As the drone traverses the path, a RF scanner mounted on the drone collects RF data. The drone transmits RF data to the SON which processes the data to identify problems in the wireless network (e.g., cell tower interference or gaps in coverage). The SON generates one or more actions for correcting the identified problem and transmits these actions to a network controller. In one example, the actions include adjusting a parameter of a cell tower in the wireless network such as changing the transmission power or the orientation of its antenna.

Once the network controller performs the action, the SON instructs the drone to re-traverse the portion of the path corresponding to the identified problem. Stated differently, the SON instructs the drone to return to the location where the drone measured RF data indicating there was a problem in the wireless network. The drone again measures RF data at this location which the SON processes to determine if the problem was resolved. If so, the changes made by the network controller are maintained. However, if the problem is not resolved, the SON may instruct the wireless network controller to implement a different remedial action or to reverse the changes in which case the controller may generate a request for manual intervention by a network engineer to solve the problem. The SON then instructs the drone to continue along the path to collect additional RF data at different locations in the wireless network. In this manner, the drone, SON, and network controller form a closed-loop system where problems in the wireless network can be identified and resolved in real-time.

Figure 1:
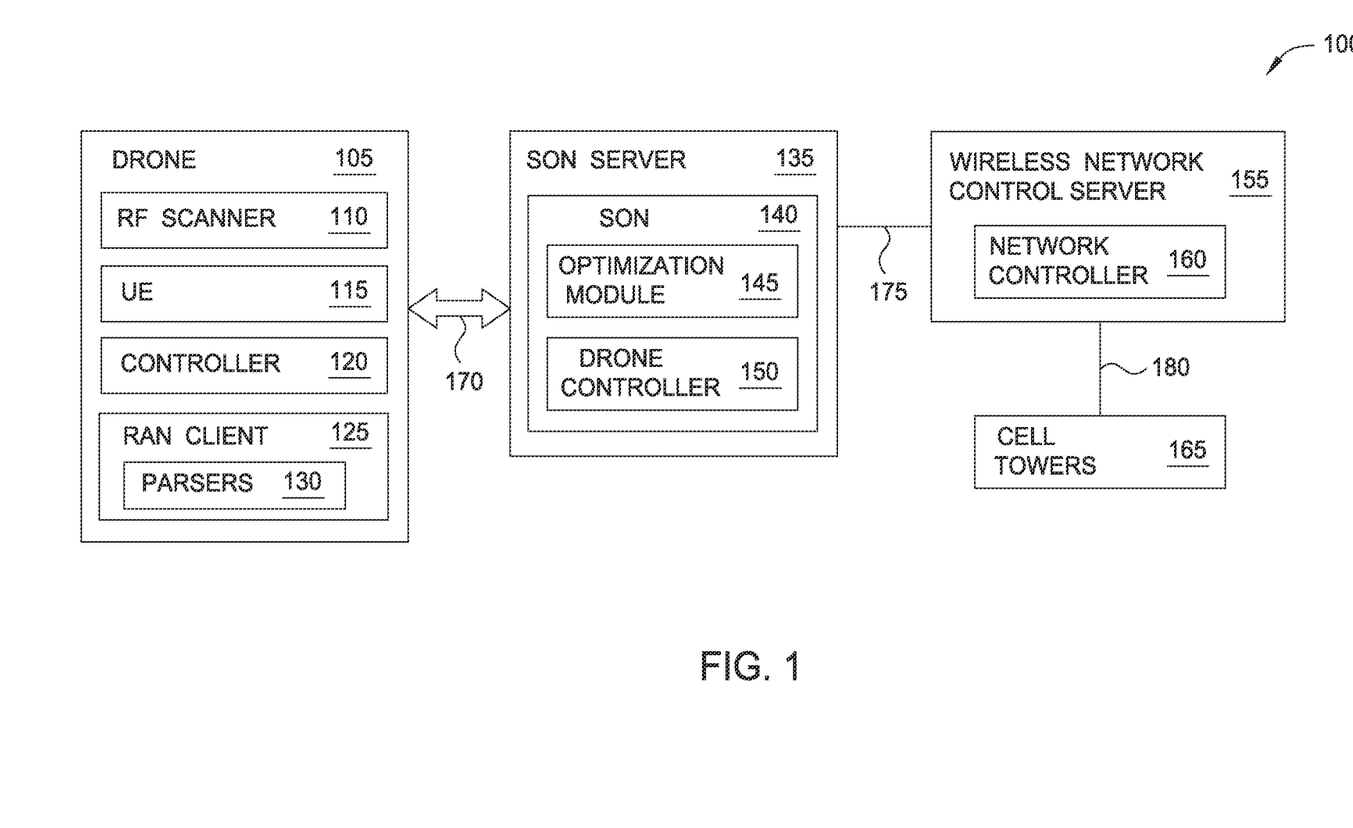
FIG. 1 is a block diagram of a closed-loop system for optimizing a wireless network, according to one embodiment described herein.

FIG. 1 is a block diagram of a closed-loop system 100 for optimizing a wireless network, according to one embodiment described herein. The system 100 includes a drone 105, a SON server 135, a wireless network control server 155, and cell towers 165. The drone 105 may be any type of autonomous vehicle such as a unmanned aerial vehicle (UAV), driverless (or self-driving) car, tracked vehicle, or a vehicle that use bipedal or quadrupedal movement. In one embodiment, the drone 105 can be controlled either by an internal controller (i.e., controller 120) or by an external system without receiving instructions from a human operator. However, in one embodiment, the drone 105 may be controlled by a human operator in the event of an emergency or if the internal and/or external controller systems fail. For example, as will be discussed in detail below, the drone 105 receives a predetermined path to traverse from the SON 140; however, if a human operator observing the drone 105 determines the drone 105 is about to collide with an object or is behaving erratically, the operator may override the controller 120 and safely navigate the drone 105. Thus, the embodiments herein do not require that the drone 105 always be operated without any human control.

In addition to the controller 120, the drone 105 includes a RF scanner 110, user equipment (UE) 115, and a radio access network (RAN) client 125. The RF scanner 110 includes one or more antennas for measuring RF signals. In one embodiment, the drone 105 may include different RF scanners 110 for measuring communication signals used by different wireless communication protocols. For example, one RF scanner 110 may measure long-term evolution (LTE) signals, while another scanner 110 measures universal mobile telecommunications signals (UMTS), and another scanner 110 measures signals generated using global systems for mobile communication (GSM).

The UE 115 may include one or more devices used by users to communicate on the wireless network—e.g., a mobile phone, tablet computer, laptop, etc. In one embodiment, instead of mounting the entire user device onto the drone 105, only the chipset of the device are included—e.g., a modem and processor. The UE 115 may be operated while the drone 105 is traversing the path provided by the SON 140 to determine if the UE 115 functions properly at different locations along the path.

The RAN client 125 may be a software module that facilitates communication between the drone 105 and the SON 140. For example, the RAN client 125 may receive the predetermined path and configuration parameters from the SON 140. Using this information, the RAN client 125 configures the RF scanner 110, UE 115, and controller 120. The RAN client 125 then relays RF data measured by the RF scanner and the UE 115 to the SON 140 for processing. In this example, the RAN client 125 includes multiple parsers 130 which may be used to filter the data measured by the RF scanner 110 and the UE 115. For example, the SON 140 may request that the RAN client 125 only transmit data about the signal strength of the wireless network along the path. In response, the parser 130 corresponding to signal strength is activated while the parsers 130 corresponding to other types of RF data (e.g., interference or data messaging) are deactivated. In this manner, the RAN client 125 pre-processes the RF data before the data is transmitted to the SON server 135. The RAN client 125 and the controller 120 may be software, hardware, or combinations thereof.

The SON server 135 includes the SON 140 which may include software, hardware, or combinations thereof. Moreover, although FIG. 1 illustrates a centralized SON (C-SON) located on server 135, the SON 140 may be distributed across multiple servers 135 or computing devices (i.e., a distributed SON). For example, the SON 140 may be executed in a data center or cloud environment where multiple computing nodes are used to execute the functions described herein.

Generally, the SON 140 can automatically configure cell towers 165 (e.g., base stations) to optimize their coverage and capacity and minimize interference between the towers 165. For example, when a new cell tower 165 is powered on, the SON recognizes the new tower and adjusts the RF parameters of the neighboring cell towers 165 to reach an optimal coverage and capacity. The SON 140 may also generate automatic neighbor relationships (ANR) between the cell towers 165 and/or provide self-healing algorithms for reducing negative impacts on the wireless network resulting from failures.

In addition to these functions, the SON 140 controls the path traversed by the drone 105 in the network as well as the type of RF data measured by the drone 105. To do so, the SON 140 includes a drone controller 150 which generates and maintains the path traversed by the drone 105. For example, a network engineer may inform the drone controller 150 what section or geographic region of the wireless network should be tested. Using road and/or topography maps, the drone controller 150 generates a path for the drone 105 to traverse in order to test the identified region of the wireless network. The drone controller 150 may consider obstacles in the region such as man-made structures, road conditions, trees, topography, and the like when selecting the path of the drone 105. Moreover, if the drone 105 is a UAV, the drone controller 150 may indicate an altitude or height that the drone 105 should fly at when traversing the path.

In addition to providing the path, the drone controller 150 may receive updates from the controller 120 on the drone 105 to determine if the drone 105 is following the path. If not, the drone controller 150 can send updated information to move the drone 105 into the desired location. As shown, the drone 105 and SON server 135 are communicatively coupled by wireless link 170.

The SON 140 also includes an optimization module 145 which processes the RF data received from the drone 105. In one embodiment, the optimization module 145 includes one or more optimization algorithms used to identify and correct problems in the wireless network such as low signal strength, interference, failure to receive or transmit layer 1, 2, or 3 data messages or packets, and the like. Once a problem is identified, the optimization module 145 generates one or more actions for optimizing the wireless network to mitigate or resolve the problem. For example, if the RF data indicates that two of the cell towers 165 interfere with each other at the current location of the drone 105, the optimization module 145 generates an instruction to reduce the output power of one of the cell towers 165 or change the physical orientation of the transmitting antenna of a tower 165 (e.g., tilt the antenna). Stated differently, the algorithms used by the optimization module 145 select which parameter in the wireless network should be changed in order to mitigate the identified problem. Of course, the optimization module 145 may determine to change several parameters on multiple cell towers 165 in order to mitigate the problem such as reducing the transmission power of one cell tower 165 but increasing the transmission power of another.

Using the communication link 175 (which may be a wired or wireless link), the optimization module 145 transmits the instructions to the wireless network control server 155 for execution. Specifically, the server 155 includes a network controller 160 which is communicatively coupled to the cell towers 165 via link (or links) 180. The network controller 160 carries out the instructions received from the optimization module 145 to change the parameter in the wireless network established by the cell towers 165. Although FIG. 1 illustrates cell towers 165, the wireless network may include different types of transmitter and/or receivers such as repeaters, network devices, and the like. When attempting to resolve an identified problem, the optimization module 145 may change other parameters in the wireless network such as the location of portable base stations (e.g., cell on wheels), bandwidth allocation amongst the towers 165, transmission frequency, handover protocols, and the like.

As described in more detail below, after the network controller 160 performs the action generated by the optimization module 145, the drone controller 150 in the SON 140 instructs the drone 105 to return to the location on the path that corresponds to the identified problem. The drone 105 again measures RF data at the location which is processed by the optimization module 145 to determine if the problem has been resolved. Thus, system 100 is a closed-loop system where the problems identified using the drone 105 and the SON 140 can be fixed in real-time using the network controller 160. Moreover, the drone 105 can return to the location of the problem and confirm that the changes made by network controller 160 resolved the problem. In one embodiment, this closed loop functions without any (or with minimal) human input or interaction, thereby greatly reducing the time required to optimize the wireless network compared to relying on a test engineer to gather RF data which is later evaluated by a network engineer who identifies optimizations for the wireless network.

Figure 2:
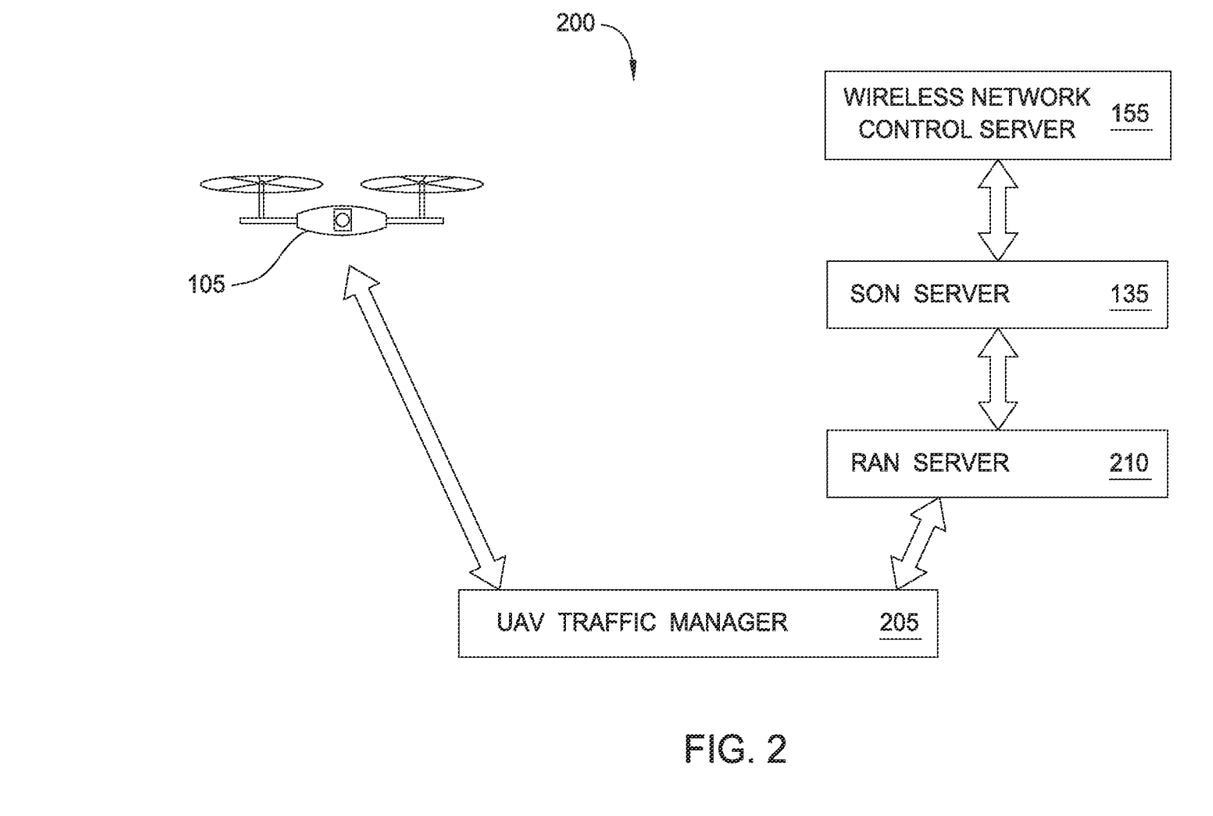
FIG. 2 illustrates a closed-loop system for optimizing a wireless network using a drone, according to one embodiment described herein.

FIG. 2 illustrates a closed-loop system 200 for optimizing a wireless network using the drone 105, according to one embodiment described herein. In this example, the drone 105 is a UAV that may include one or more propellers for directing the flight path of the drone 105. Although not shown here, the drone 105 may include RF scanners 110, UE 115, a controller 120 (e.g., a flight controller), and the RAN client 125 as illustrated in FIG. 1.

The system 200 also includes a UAV traffic manager 205 which serves as an intermediary between the flight controller on the drone 105 and a RAN server 210. That is, the UAV traffic manager 205 routes the RF data measured by the RF scanners and the UE on the drone to the RAN server 210 using a wired or wireless connection. The UAV traffic manager 205 also provides the flight path information generated by the SON server 135 to the drone 105. In addition, the UAV traffic manager 205 may aid in the drone 105 in other tasks such as obstacle avoidance, weather conditions, monitoring internal systems, and the like.

The RAN server 210 provides connectivity between the traffic manager 205 and the SON server 135. For example, the RAN server 210 communicates with a RAN client executing on the drone 135. The RAN server 210 forwards the RF data received from the RAN client to the SON server 135. As mentioned above, the RAN server 135 processes the RF data to identify problems in the wireless network at a particular geographic location or region. If a problem is found, the SON server generates one or more actions which are forwarded to the wireless network control server 155. The server 155 performs the requested action by changing a parameter in the wireless network—e.g., changing the orientation of an antenna in a cell tower. Once the action is complete, the SON server 135 instructs the drones via the RAN server 210 to return to the geographic location in the wireless network. By again measuring the RF data at that location, the SON server 135 can determine if the action resolved the problem in the wireless network.

Figure 3:
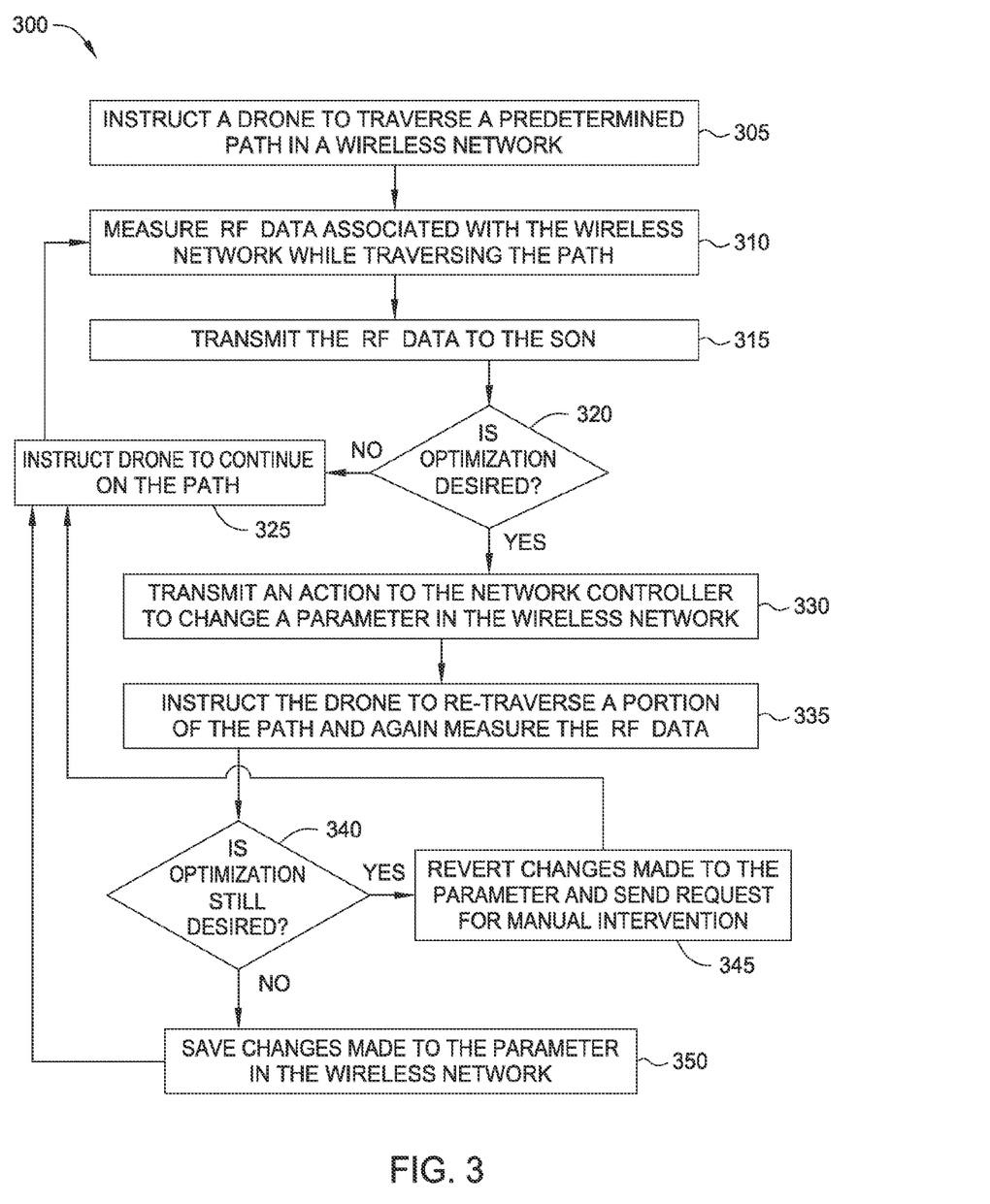
FIG. 3 is a flow chart for optimizing a wireless network using a drone, according to one embodiment described herein.

FIG. 3 is a flow chart illustrating a method 300 for optimizing a wireless network using a drone, according to one embodiment described herein. At block 305, a drone controller in the SON instructs a drone to traverse a predetermined path in a wireless network. If the drone is a driverless car, the path may include a route on city streets or highways. If the drone is a UAV, the path may include a desired altitude that may vary at different locations in the path. A controller on the drone may use a guidance system that relies on GPS signals or cell tower triangulation to move the drone along the predetermined path.

At block 310, a RF scanner and/or UE on the drone measure RF data associated with the wireless network while the drone traverses the path. For example, the RF scanner may measure interference or signal strength for a particular wireless band or frequency range. Moreover, the error rates indicative of whether the UE can receive data messages from cell towers in the wireless network as the drone moves along the path. Additionally, the RF data may indicate whether handoffs are done correctly as the UE passes between coverage areas of different cell towers. These examples, however, illustrate just a few of the different types of RF data that can be collected and measured by the drone.

At block 315, a RAN client on the drone transmits the RF data to the optimization module in the SON which processes the data using one or more optimization algorithms. In one embodiment, the optimization module identifies problems or issues in the wireless network. To do so, the optimization module may compare the measured RF data to one or more thresholds to determine if the wireless signals at the location of the drone are satisfactory. In one example, the optimization module may compare the signal strength measured by the RF scanner on the drone to a minimum threshold to ensure the signal strength is above the minimum threshold at the current geographic location of the drone. In another example, the optimization module may determine whether a data transmission error rate of the UE satisfies a minimum error rate.

At block 320, the SON determines if optimization is desired. If after processing the RF data the SON determines that the wireless network should not be changed—e.g., the RF data is within acceptable tolerances or thresholds, method 300 proceeds to block 325 where the SON instructs the drone to continue on the path 325. Method 300 then returns to block 310 where the drone measures RF data corresponding to a different location along the predetermined path.

However, if the RF data does not satisfy one of the thresholds, the SON optimizes the network by changing a parameter in the wireless network. For example, the signal strength at the location of the drone may be below the minimum floors or too many data packets may be dropped when transmitting or receiving using the UE. In response, the optimization module uses an optimization algorithm to identify one or more parameters to change in the wireless network so that the network satisfies the desired thresholds. In one embodiment, the optimization algorithms may execute a simulation of the wireless network where a parameter in the wireless network is changed to determine if changing the parameter improves the quality of the signals at the location the RF data was measured. The optimization algorithm may also ensure that changing the parameter does not cause other locations in the wireless network from satisfying the desired threshold.

In one embodiment, logic on the drone (e.g., the controller) may process the RF data to identify a problem in the network. For example, the drone may evaluate the RF data to identify problems that are easily identifiable—e.g., if the signal strength is less than a desired threshold. Permitting the drone to process some or all of the data may improve the performance of method 300 since the drone can inform the SON of identified problems rather than relying solely on the optimization module to discover a network problem.

Using the optimization algorithm, the optimization module identifies one or more parameters to change in the wireless network. At block 330, the optimization module transmits an action to the network controller to change the identified parameters in the wireless network. As shown in FIG. 1, network controller 160 is communicatively coupled to cell towers 165 thereby permitting the controller 160 to adjust their RF parameters. In addition to changing RF parameters of the cell tower, the actions provided by the optimization module may change other parameters in the wireless network such as bandwidth allocation amongst the towers 165, transmission frequency, handover protocols, etc.

At block 335, the drone controller on the SON instructs the drone to re-traverse a portion of the path and again measure the RF data. In one embodiment, the drone transmits the RF data in discrete intervals—e.g., once every one or two minutes. Thus, by the time the optimization module in the SON evaluates the RF data, generates actions to resolve a problem in the wireless network, and receives confirmation from the network controller that the actions where performed, the drone may have already moved to a different location along the path. In such as case, the done controller on the SON transmits instruction to the controller on the drone to return the drone to the location on the path corresponding to the identified problem. Stated differently, the drone returns to the location on the path where it measured RF data that the SON used at block 320 to determine that the wireless network should be optimized.

Once at the previous location, the drone again measures the RF data at that location and transmits this data to the SON. In one embodiment, instead of sending the same RF data to the SON that was sent previously, the SON may send a subset of the data. For example, if the SON detected interference at the location but the data message error rate was within tolerable limits, the SON may instruct the RAN client on the drone to only send RF data related to interference while RF data about the data message error rate (and any other type of RF data that was within tolerable limits) can be ignored. Thus, this limits the amount of data sent to the SON which may result in the SON receiving the data faster.

At block 340, the optimization module on the SON determines if optimization is still desired. That is, the optimization module determines whether the parameters changed at block 330 corrected the problem at the location of the drone in the wireless network. For example, the optimization module may determine, by processing the updated RF data, whether the signal strength is now above the minimum desired threshold or whether the data message error rate has fallen below a maximum allowable rate. If not, method 300 proceeds to block 345 where the SON instructs the network controller to revert the changes made to the parameter at block 330. In addition, the SON may send a request for manual intervention by a human operator. Put differently, the SON may flag the location of the drone as a problem area and request that a network engineer attempt to diagnosis and correct the problem.

In one embodiment, when the SON determines at block 340 that optimization is still needed, the optimization module may again use multiple attempts to identify one or more parameters to change in the wireless network to resolve the problem. The optimization module may use a different optimization algorithm or adjust the configuration of the optimization module so that different parameters or parameter values are outputted. In this manner, the SON may attempt to correct the identified problem by changing different parameters or using different parameter values before sending a request for manual intervention. Each time the SON and network controller change a parameter, the drone may again measure the RF data at the location (i.e., provide feedback) so that the SON can determine if the problem has been corrected.

Assuming the actions generated by the SON resolve the identified problem, method 300 proceeds to block 350 where the SON instructs the network controller to save the changes made in the parameter in the wireless network. Regardless whether the problem was or was not resolved, method 300 proceeds to block 325 where the drone continues along the predetermined path. In one embodiment, the drone controller instructs the drone to return to the location the drone was at before the drone re-traversed the portion of the path at block 335. Method 300 then repeats at block 310 where the drone continues to measure RF data at new locations along the path that is processed by the SON to determine if optimizing the wireless network is desired.

Although not shown in method 300, the controller on the drone may monitor the internal systems of the drone to ensure safe operation. For example, if the controller determines the drone's energy source is running low (e.g., batteries or gasoline), the controller may abort method 300 and cause the drone to return to a safe location. Moreover, if the controller measures unsafe conditions such as pedestrians on the road during a special event (if the drone is a driverless car) or unsafe weather conditions (if the drone is a UAV), the controller may abort method 300 and move the drone to a safe location. Similarly, if a component or system in the drone fails (e.g., a propeller stops working), the controller may force the drone to land in a safe location.

Figure 4:
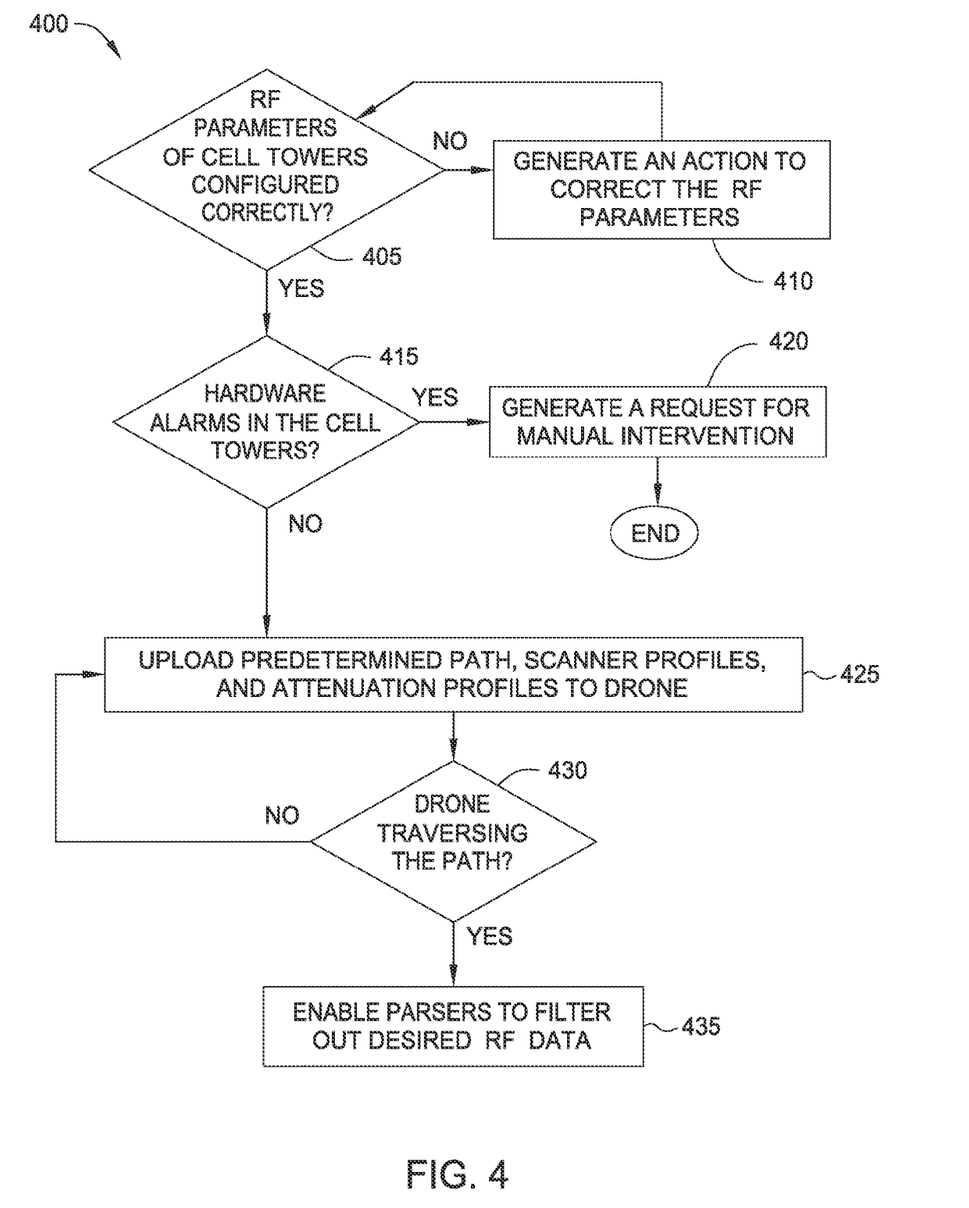
FIG. 4 is a flow chart for preparing to launch a drone, according to one embodiment described herein.

FIG. 4 is a flow chart illustrating a method 400 for preparing to launch a drone, according to one embodiment described herein. At block 405, the SON determines whether RF parameters of the cell towers in the wireless network are configured correctly. The SON may, for example, ensure that neighboring towers are not interfering with each other or that cell towers provide the desired coverage and capacity. If not, method 400 proceeds to block 410 where the optimization module in the SON generates an action to correct the RF parameters. The optimization module may adjust the same parameters discussed above such as the transmission power of the cell towers or the antenna tilt in order to ensure the RF parameters are configured correctly. In one embodiment, the SON adjusts the RF parameters to ensure that the signal strength, interference levels, data message error rate, etc. are within desired elements. However, because the algorithm used by the SON may be imperfect, the drone can be used measure RF data to ensure the wireless network is configured properly. In some jurisdictions, collecting RF data to ensure the signals in the wireless network are within acceptable limits may be a requirement of a government agency.

If the RF parameters are configured properly, at block 415, the SON determines if there are any hardware alarms in the cell towers. Generally, hardware failures are outside of the scope of SON, and as such, the SON is not able to correct these problems without the help of human intervention. If a hardware alarm is detected, at block 420, the SON generates a request for manual intervention for a human operator to evaluate and correct the hardware alarm. For example, a service crew may be dispatched to fix or replace hardware components in the cell tower generating the alarm. Once the request is made, method 400 ends and the SON may wait until the hardware alarm is fixed before dispatching the drone. However, in one embodiment, the SON may dispatch the drone to a portion of the wireless network that is unaffected by the hardware failure. For example, the SON may generate a path for the drone that is outside the coverage area of the cell tower that needs repairs. In this example, method 400 may continue.

At block 425, the drone controller in the SON uploads a predetermined path, scanner profiles, and attenuation profiles to the drone. As mentioned above, the predetermined path defines a route through the wireless network. The predetermined path may include a continuous route or discrete points which the drone travels between. Moreover, if the drone is a UAV, the predetermined path may stipulate the altitude of the drone as it flies along the path.

The scanner profiles instruct the drone to gather RF data for a particular frequency or band of frequencies. In one embodiment, the scanner profiles correspond to a particular communication protocol such as LTE, UMTS, or GSM. The RAN client on the drone may use the scanner profiles to configure the RF scanner on the drone to gather RF data in the frequencies indicated in the scanner profiles.

The RAN client on the drone may use the attenuation profiles to adjust the RF data collected using the RF scanner. In one embodiment, the attenuation profiles account for regional geographic variations which affect wireless signals differently. For example, a geographic region may have greater amounts of humidity or increased foliage from trees which may attenuate the wireless signals. The attenuation profiles take these variations into account when measuring the RF data. In one embodiment, an attenuation profile adjusts the RF data to account for the altitude of a UAV collecting the RF data. For example, the UAV may collect the RF data at an altitude of 5-10 meters above ground level. However, because the user devices will typically be at ground level when being used, the attenuation profile permits the RAN client to adjust the RF measured at 5-10 meters to correspond to what would have been measured if the UAV was at ground level. Stated differently, the attenuation profile enables the drone to estimate or extrapolate the value of the RF data as if the UAV was, for example, a car traveling on a road.

Once the predetermined path is uploaded, the SON may launch the drone. At block 430, the SON determines if the drone is traversing the predetermined path. For example, the controller on the drone may report the location of the drone to the SON continuously or at intervals. Using these updates, the drone controller in the SON can track the drone to ensure the drone follows the path.

If the drone is traversing the path, at block 435, the RAN client on the drone activates the parsers which begin to filter and forward the RF data to the SON. For example, the SON may request that the RAN client transmit only data about the signal strength of the wireless network along the path. In response, the parser corresponding to signal strength is activated while the parsers corresponding to other types of RF data (e.g., interference) are deactivated. In this manner, the RAN client pre-processes the RF data to determine what types of data to transmit to the SON.

In one embodiment, the SON does not begin collecting the RF data until the drone reaches the start of the predetermined path. That is, the drone may wait to transmit RF data until the drone reaches the starting point of the path. Once the SON or the controller on the drone confirms the drone is at the start location of the path, the RAN client activates the parsers at block 435 and begins transmitting the RF data to the SON.

Figure 5:
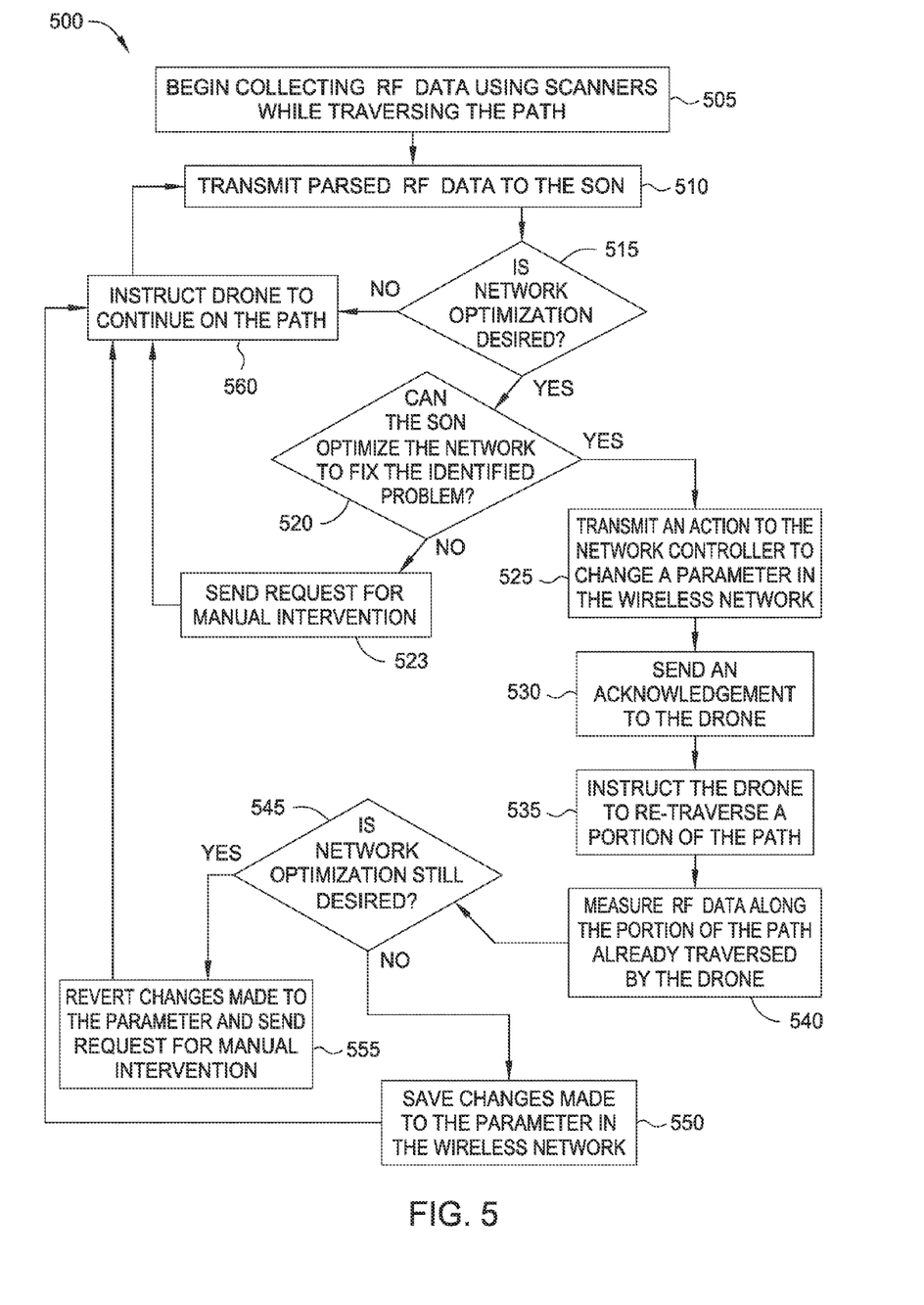
FIG. 5 is a flow chart for optimizing a wireless network using a drone, according to one embodiment described herein.

FIG. 5 is a flow chart illustrating a method 500 for optimizing a wireless network using a drone, according to one embodiment described herein. In one embodiment, method 500 may begin after method 400 in FIG. 4 is performed. For example, method 400 may be a pre-check process used to ensure the wireless network and drone are ready to perform method 500.

At block 505, the drone begins collecting RF data using a RF scanner and UE while traversing the predetermined path. As discussed, the drone may process (e.g., filter) the collected RF data using the parsers in the RAN client. At block 510, the drone transmits the parsed RF data to the SON which evaluates the RF data to determine whether the data indicates there is a problem or issue in the wireless network. For example, the SON may compare the measured signal strength or interference to one or more thresholds to identify a problem. The SON can also identify errors in data messaging or failures to correctly perform a cell tower handover.

At block 515, the SON determines whether network optimization is desired. Assuming no problems in the wireless network were identified, method 400 proceeds to block 560 where the drone is permitted to continue on the predetermined path to measure the RF data at a new geographic location. However, if a problem is identified, at block 520, the optimization module determines whether it is capable of optimizing the wireless network to fix the identified problem. The RF data may indicate there is a problem in the wireless network that cannot be fixed by SON and may require a human operator to handle. For example, the RF data may indicate a hardware problem or structural failure at a cell tower, or the optimization module may determine a cell tower needs to be added or moved. These issues may require a human operation to replace, repair, move, or construct a physical component, and thus, cannot be performed by SON. At block 523, the SON sends a request for manual intervention which may be received and evaluated by a network engineer. The SON then permits the drone to continue along the predetermined path at block 560.

Conversely, if the identified problem is one that can be handled by SON, at block 525, the optimization module transmits an action to the network controller to change a parameter in the wireless network. As discussed above, the action may include adjusting the signal strength or a tilt of a transmitting antenna in the cell tower. Other actions may include changing parameters network devices or other components that form a backplane for the wireless network.

Once the network controller performs the action, at block 530, the drone controller in the SON sends an acknowledgement to the drone, and at block 535, instructs the drone to re-traverse a portion of the path. The drone controller instructs the drone to return to the geographic location where the drone measured the RF data that indicated the wireless network should be optimized. For example, the drone may have continued along the path while the SON evaluated the RF data, identified the problem, and instructed the network controller to fix the problem. Since the drone is at a different location, the drone controller instructs the drone at block 535 to return to a portion of the path that was previously traversed. However, in another embodiment, the drone may stay at a geographic location until the SON evaluates the data and determines there is no problem with the network before the drone moves to a new location along the path. In this case, the drone does not need to move.

At block 540, the RF scanner measures RF data along the portion of the path already traversed by the drone. The RAN client may again parse this data using the parses and transmit the RF data to the SON. At block 545 the SON determines whether network optimization is still desired. For example, the SON determines if the RF data indicates the problem has been fixed—e.g., the signal strength at the location is above a predefined minimum threshold. If so, at block 550, the SON instructs the network controller to save the changes made to the parameter in the wireless network. In this manner, the SON uses the drone in a real-time feedback loop to confirm that changing the parameter in the wireless network at block 525 improved the wireless network.

If the SON determine the changes in the wireless network did not resolve the problem, method 500 proceeds to block 555 where the SON instructs the network controller to revert changes made to the parameter to a previous value. However, in another embodiment, if the change to the parameter improved the optimization but did not resolve the problem completely, the SON may nonetheless instruct the network controller to save the change to the parameter. For example, if changing the signal strength of a cell tower improves the signal strength at the geographic location by 10%, but a 15% improvement is needed to satisfy a minimum signal strength requirement, the SON may nonetheless instruct the network controller to save this change rather than revert the parameter to a previous setting.

In addition, the SON sends a request for manual intervention by a network engineer or service technician. That is, because the SON failed to resolve the problem, the SON may request that a human operator handle the problem. Regardless whether the SON successfully solved the problem itself or manual intervention is requested, method 500 proceeds to block 560 where the SON instructs the drone to continue on the predetermined path to measure RF data at a new geographic location.

Method 500 then repeats at block 510 until the drone completes the path or the drone needs to return to a base station because of, e.g., a mechanical failure, low battery, poor weather, and the like. In one embodiment, the SON may simultaneously control multiple drones which are each given a portion of a predetermined path or route. In this example, each drone may traverse its own portion of the path and be operated according to method 500 to identify and fix problems in the wireless network. In another example, the SON may control a first drone so that it traverses the predetermined path and collects RF data which the SON uses to identify problems in the network. The SON may instruct a second drone to navigate to the geographic locations corresponding to the problems while the first drone continues along the path. The SON may gather updated RF data from the second drone after adjustments are made in the wireless network to determine if the problem is resolved. Once resolved (or manual intervention is requested), the SON may instruct the second drone to navigate to the next problem location identified using the data measured by the first drone. In this manner, the first drone does not need to stop traversing the path in order to provide feedback, but instead can continue on the path while the second drone measures data for determining if the problems are resolved.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the SON) or related data available in the cloud. For example, the SON could execute on a computing system in the cloud and communicate with the drone and the network controller. In such a case, the SON could identify problems in the received RF data and store actions at a storage location in the cloud. Doing so allows drone to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   transmitting a path to a drone;
   receiving, at a self-organizing network (SON), RF data measured by the drone while traversing the path;
   upon determining a problem in a wireless network based on the received RF data, transmitting an action to change a parameter of a wireless network;
   after transmitting the action to change the parameter, instructing the drone via the SON to measure updated RF data at a location on the path corresponding to the problem;
   evaluating the updated RF data at the SON to determine whether the problem was resolved;
   transmitting a scanner profile from the SON to the drone, the scanner profile identifying one or more frequencies to be scanned by the drone to generate the RF data; and
   transmitting an attenuation profile from the SON to the drone, the attenuation profile providing parameters for processing the RF data based on environmental conditions along the path.

2. The method of claim 1, wherein the action is transmitted from the SON to a network controller configured to adjust the parameter of the wireless network, wherein the network controller is communicatively coupled to a cell tower generating the wireless network.

3. The method of claim 2, wherein the parameter of the wireless network is at least one of a signal strength of the cell tower and an orientation of an antenna in the cell tower.

4. The method of claim 1, further comprising:
upon determining the problem was resolved based on the updated RF data, transmitting an instruction to save the changed parameter of the wireless network; and
instructing the drone to move to a new location along the path.

5. The method of claim 1, further comprising:
upon determining the problem was not resolved based on the updated RF data,
reverting the changed parameter to an updated value;
transmitting a request for intervention by a human operator to resolve the problem; and
instructing the drone to move to a new location along the path.

6. The method of claim 1, further comprising:
before transmitting the action to change the parameter, determining that the problem is of a type that can be resolved using the SON without requiring human intervention.

7. A self-organizing network (SON), comprising:
a drone controller configured to transmit a path to a drone; and
an optimization module configured to:
receive RF data measured by the drone while traversing the path,
upon determining a problem in a wireless network based on the received RF data, transmit an action to change a parameter of the wireless network;
instruct the drone via the drone controller to measure updated RF data at a location on the path corresponding to the problem;
evaluate the updated RF data to determine whether the problem was resolved:
transmit a scanner profile to the drone, the scanner profile identifying one or more frequencies to be scanned by the drone to generate the RF data; and
transmit an attenuation profile to the drone, the attenuation profile providing parameters for processing the RF data based on environmental conditions along the path.

8. The SON of claim 7, wherein the action is transmitted from the SON to a network controller configured to adjust the parameter of the wireless network, wherein the network controller is communicatively coupled to a cell tower generating the wireless network.

9. The SON of claim 8, wherein the parameter of the wireless network is at least one of a signal strength of the cell tower and an orientation of an antenna in the cell tower.

10. The SON of claim 7, wherein the optimization module is configured to:
upon determining the problem was resolved based on the updated RF data, transmit an instruction to save the changed parameter of the wireless network; and
wherein the drone controller is configured to instruct the drone to move to a new location along the path.

11. The SON of claim 7, wherein the optimization module is configured to:
upon determining the problem was not resolved based on the updated RF data, revert the changed parameter to an updated value; and transmit a request for intervention by a human operator to resolve the problem; and
wherein the drone controller is configured to instruct the drone to move to a new location along the path.

12. The SON of claim 7, wherein the optimization module is configured to:
before transmitting the action to change the parameter, determine that the problem is of a type that can be resolved using the SON without requiring human intervention.

13. A communication system, comprising:
an autonomous vehicle (AV);
a wireless network comprising a plurality of cell towers controllable by a network controller to establish a wireless network;
a SON configured to:
transmit a path to the AV to traverse in the wireless network;
receive RF data measured by the AV while traversing the path;
upon determining a problem in the wireless network based on the received RF data, transmit an action to the network controller to change a parameter of the wireless network;
instruct the AV to measure updated RF data at a location on the path corresponding to the problem;
evaluate the updated RF data at the SON to determine whether the problem was resolved:
transmit a scanner profile to the AV, the scanner profile identifying one or more frequencies to be scanned by the AV to generate the RF data; and
transmit an attenuation profile to the AV, the attenuation profile providing parameters for processing the RF data based on environmental conditions along the path.

14. The communication system of claim 13, wherein the parameter of the wireless network is at least one of a signal strength of the cell tower and an orientation of an antenna in the cell tower.

15. The communication system of claim 13, wherein the SON is configured to:
instruct the AV to re-traverse the portion of the path to measure updated RF data after determining the network controller has changed the parameter of the wireless network.

16. The communication system of claim 15, wherein the SON is configured to:
upon determining the problem was resolved based on the updated RF data, transmit an instruction to the network controller to save the changed parameter of the wireless network; and
instruct the AV to move to a new location along the path.

17. The communication system of claim 13, wherein the SON is configured to:
before transmitting the action to change the parameter, determining that the problem is of a type that can be resolved using the SON without requiring human intervention.

18. A self-organizing network (SON), comprising:
a drone controller configured to transmit a path to a drone; and
an optimization module configured to:
receive RF data measured by the drone while traversing the path,
upon determining a problem in a wireless network based on the received RF data, transmit an action to change a parameter of the wireless network;

instruct the drone via the drone controller to measure updated RF data at a location on the path corresponding to the problem;
evaluate the updated RF data to determine whether the problem was resolved;
upon determining the problem was not resolved based on the updated RF data, revert the changed parameter to an updated value;
transmit a request for intervention by a human operator to resolve the problem; and
wherein the drone controller is configured to instruct the drone to move to a new location along the path.

\* \* \* \* \*